United States Patent
Boinais et al.

(10) Patent No.: US 7,851,039 B2
(45) Date of Patent: Dec. 14, 2010

(54) DECORATIVE TRIM AND METHOD FOR MAKING SAME

(75) Inventors: Olivier Boinais, West Bloomfield, MI (US); Robert R. Chimelak, Warren, MI (US); Randy J. Shaddach, Clinton Township, MI (US); Aaron S. Wisniewski, Plymouth, MI (US)

(73) Assignee: Faurecia Interior Systemns, Inc., Auburn Hills, MI (US)

( * ) Notice: Subject to any disclaimer, the term of this patent is extended or adjusted under 35 U.S.C. 154(b) by 228 days.

(21) Appl. No.: 12/209,474

(22) Filed: Sep. 12, 2008

(65) Prior Publication Data
US 2010/0068425 A1    Mar. 18, 2010

(51) Int. Cl.
*B32B 3/30* (2006.01)
(52) U.S. Cl. .................................. 428/103; 428/102
(58) Field of Classification Search ................ 428/104, 428/103, 102, 172; 112/417, 418, 405, 421
See application file for complete search history.

(56) References Cited

U.S. PATENT DOCUMENTS

| | | | |
|---|---|---|---|
| 3,961,001 A | 6/1976 | Bethe | |
| 4,541,885 A | 9/1985 | Caudill, Jr. | |
| 4,711,190 A | 12/1987 | Smith | |
| 4,769,278 A | 9/1988 | Kamimura et al. | |
| 4,995,926 A | 2/1991 | Urai | |
| 5,333,933 A | 8/1994 | Urai | |
| 5,395,473 A | 3/1995 | Nixon | |
| 5,571,597 A | 11/1996 | Gallagher et al. | |
| 5,957,483 A | 9/1999 | Miltenberger | |
| 6,408,541 B1 * | 6/2002 | Moretti | 36/12 |
| 6,655,711 B1 | 12/2003 | Labrie | |
| 6,986,543 B2 | 1/2006 | Reed | |
| 7,052,566 B2 | 5/2006 | Wright | |
| 7,070,221 B2 | 7/2006 | Cowelchuk et al. | |
| 2006/0029751 A1 | 2/2006 | Cowelchuk | |
| 2007/0014969 A1 | 1/2007 | Olley | |
| 2008/0073807 A1 | 3/2008 | Cowelchuk et al. | |
| 2008/0129071 A1 | 6/2008 | Hipshier et al. | |
| 2008/0157432 A1 | 7/2008 | Boyer | |

FOREIGN PATENT DOCUMENTS

EP            538992 A1 *    4/1993

OTHER PUBLICATIONS

International Search Report and Written Opinion for corresponding PCT application PCT/US09/40744, Jun. 4, 2009.

* cited by examiner

*Primary Examiner*—Alexander Thomas
(74) *Attorney, Agent, or Firm*—Matthew B. Dernier, Esq.; Gibson & Dernier LLP (57) ABSTRACT

An article of manufacture and method are disclosed which may include a skin including a molded groove, the skin having an exposed surface and a lower surface, the skin forming a sheet of material; a seal having an upper surface disposed adjacent to the lower surface of the skin and covering a region of the lower surface of the skin including the molded groove; at least one strand of stitching material threaded between the exposed surface of the skin and the foam backing layer; and a backing layer forming a backing for the skin and the seal, the backing layer having an upper surface secured to the skin and the seal, and a lower surface.

8 Claims, 9 Drawing Sheets

DECORATIVE TRIM AND METHOD FOR MAKING SAME

BACKGROUND OF THE INVENTION

This application relates generally to automotive trim surfaces and in particular to trim surfaces providing a desirable feel or appearance.

Existing automotive trim surfaces employ various cosmetic effects to enhance the appearance and feel of interior automotive surfaces. One existing approach involves vacuum forming impressions on the exposed surface of the skin of an interior trim surface that emulate seams, stitching, or other feature intended to provide a desirable appearance and/or desired feel. Foam is generally laminated to the skin by a material supplier prior to vacuum forming the skin. The skin is then assembled to either a polypropylene (PP) or Acrylonitrile-Butadiene-Styrene (ABS) substrate. In selective cases, the surfaces created by vacuum forming are able to provide the surface characteristics similar to that of a higher quality material such as leather. However, the tactile characteristics arising from the ABS or PP material are generally less than ideal.

Another existing approach involves vacuum forming seam impressions on the exposed surface of the skin thereby simulating the impression of a real stitched surface. This process may be used in conjunction with real stitching on the skin. The skin is then commonly attached to a substrate made of PP or ABS. However, this approach does not provide additional aesthetic or tactile characteristics to that of traditional TPO material.

Yet another prior art approach employs leather as the skin of the automotive trim and attaching a foam backing layer to the leather skin. While a leather skin would provide an authentic look and feel for the interior trim, the cost of this approach may be prohibitive for many automotive designs.

Accordingly, there is a need in the art for an improved skin/foam assembly that provides desirable aesthetic and tactile characteristics at a reasonable cost.

SUMMARY OF THE INVENTION

According to one aspect, the invention is directed to an article of manufacture, that may include a skin including a molded groove, the skin having an exposed surface and a lower surface, the skin forming a sheet of material; a seal having an upper surface disposed adjacent to the lower surface of the skin and covering a region of the lower surface of the skin including the molded groove; at least one strand of stitching material threading the skin and the seal together; and a backing layer forming a backing for the skin and the seal, the backing layer having an upper surface secured to the skin and the seal, and a lower surface. However, in alternative embodiments, the strand of stitching material may be omitted.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. Phrases such as "in one embodiment" or "in an embodiment" in various places in the specification do not necessarily all refer to the same embodiment.

A dilemma is encountered when attempting to optimize both the aesthetic and tactile characteristics of interior automotive trim due to the characteristics of various types of foam and of the precursor foaming materials that form the respective foam types. The pertinent dilemma is described below.

Materials such as ABS and PP, as discussed in the Background section, tend to be easier to work with during the manufacturing process, since the high viscosity of molten ABS and PP material tends to inhibit such material from leaking through uncovered areas, such as the stitching holes that are desired in embodiments of the present invention.

However, ABS and PP, in their final solidified condition, have undesirable tactile characteristics when employed within interior trim. Specifically, these materials tend to be firmer to the human touch and generally provide a rougher and lower-quality feel to an automotive interior than softer, foam materials provide.

Open cell polyurethane (PUR) foam presents the advantage of providing more desirable tactile characteristics, such as softness, in its final, cured form than do ABS or PP. However, PUR foam is very liquid, that is, very non-viscous, in its uncured condition. It was observed that uncured PUR foaming material tended to leak through the stitching holes of stitch lines 102 when poured in between skin 100 and a suitable substrate. Accordingly, the inventors were confronted with a choice between two alternatives, each having benefits and disadvantages.

A first choice involves the use of authentic stitches in the skin and an ABS or PP substrate which provides the aesthetically pleasing appearance of authentic stitching, but which incurs the disadvantage of having the undesirable tactile characteristics of the ABS or PP materials. A second choice could include employing PUR foam for the backing layer to benefit from the desirable tactile properties PU foam. However, this second choice would require using a skin 100 having no holes, and therefore no stitching, to avoid the problem of foam leakage during the curing process. This second choice thus incurs the disadvantage of having less aesthetic appeal than does authentic stitching. Accordingly, the inventors sought to provide interior trim that is both aesthetically appealing and having desirable tactile properties.

The embodiments of FIGS. 1-6 are preferably operable to provide an automotive trim 10 having desirable aesthetic and tactile characteristics while not incurring leakage of foaming material through holes used for stitch lines 102.

Figure 1:
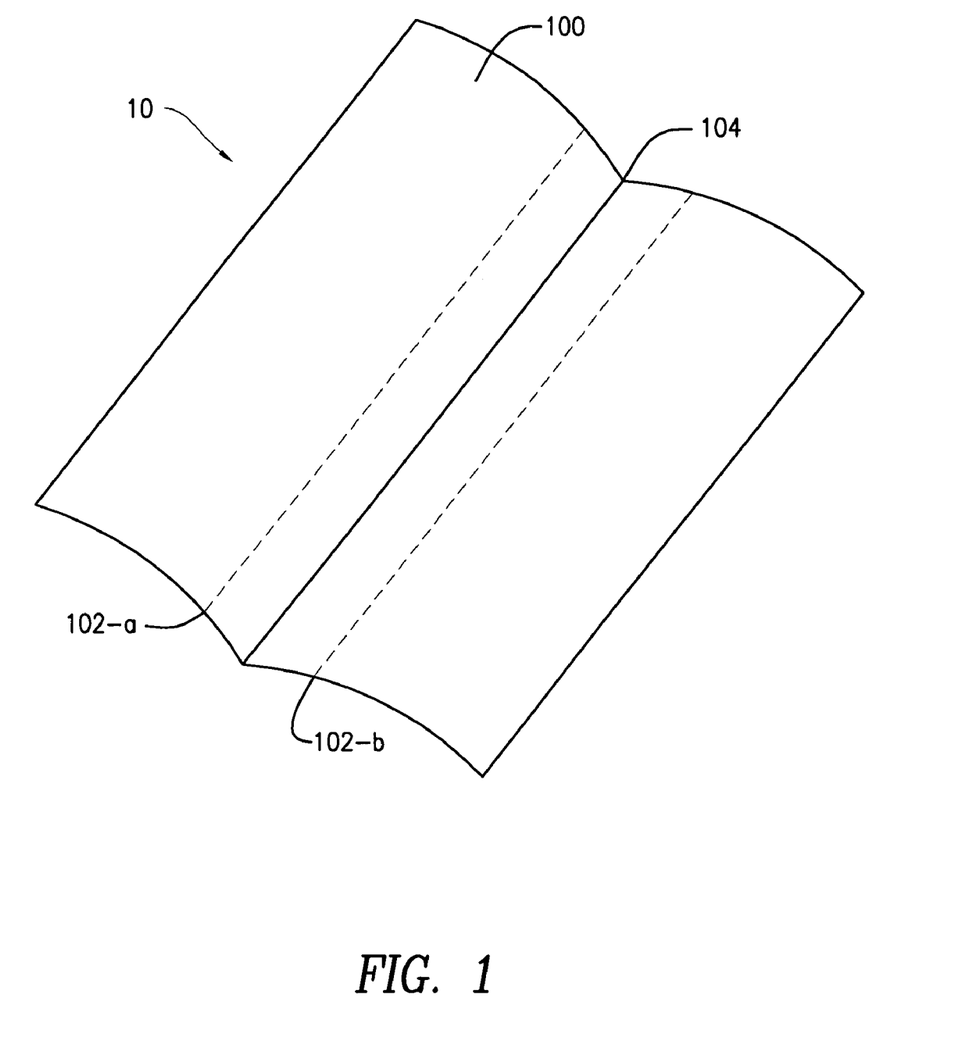
FIG. 1 is a perspective view of the interior surface of the skin layer of the interior trim portion of a vehicle in accordance with an embodiment of the present invention.

FIG. 1 is a perspective view of the interior surface of the skin layer 100 of an interior trim section 10 of a vehicle in accordance with an embodiment of the present invention. FIG. 1 shows skin 100 which may include seam 104, and/or stitch lines 102-a and/or 102-b. Desirable aesthetic and tactile characteristics of trim section 10 may be obtained by implementing one or more features of the embodiments described in the following. Seam 104 may incorporate one or more of many possible shapes such as, but not limited to a molded groove, a lap joint, a French seam, a deck seam, and/or a double deck seam. Stitch lines 102 may incorporate one or more types of decorative stitching including but not limited to a French stitch, baseball stitching, and/or double cross-over stitching.

Figure 2:
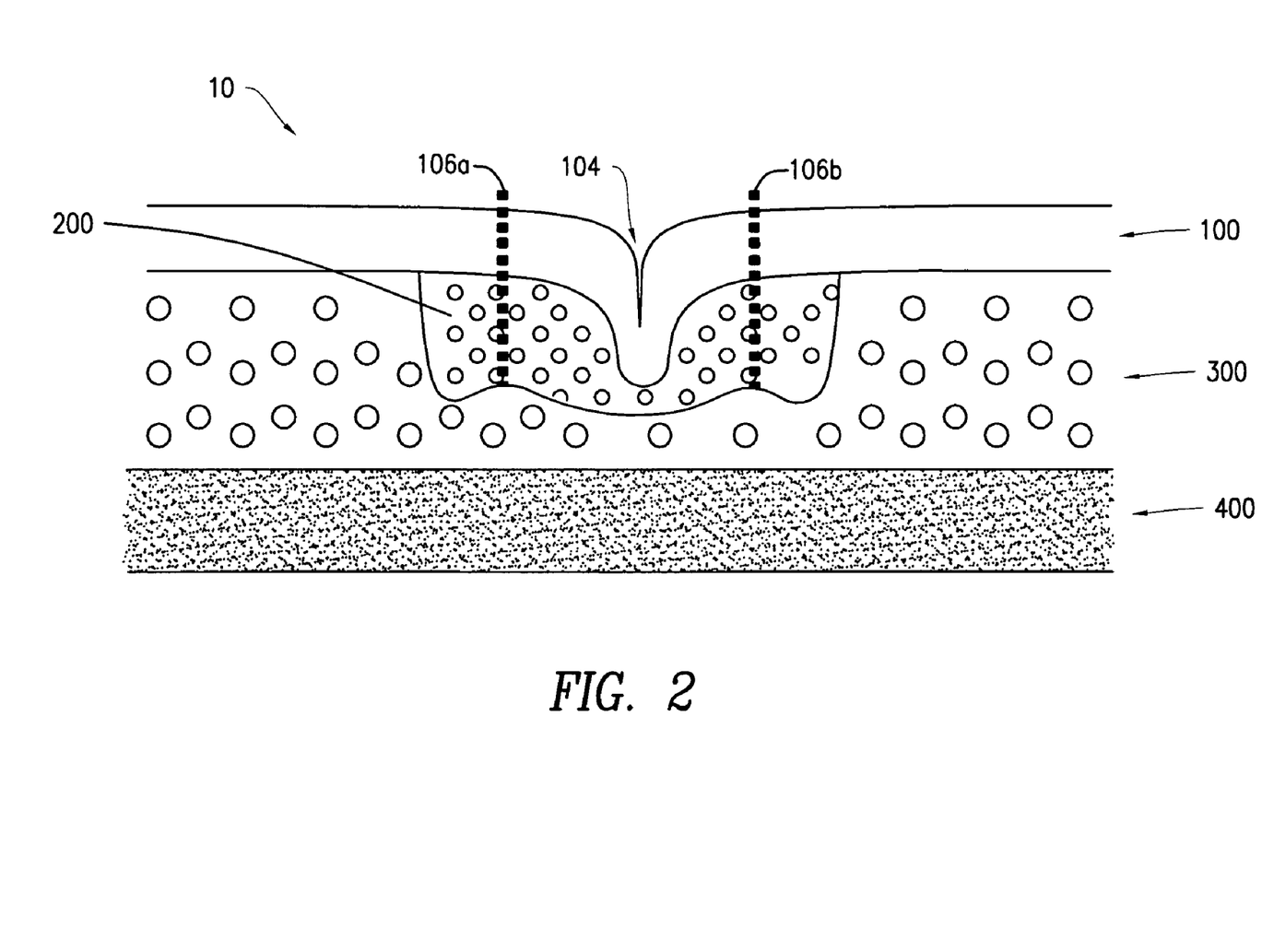
FIG. 2 is a sectional view of a portion of the interior trim of a vehicle in accordance with an embodiment of the present invention.

FIG. 2 is a sectional view of a portion of the interior trim 10 of a vehicle in accordance with an embodiment of the present invention. Trim section 10 may include skin 100, seal 200, backing layer 300, and/or substrate 400. As described in FIG. 1, skin 100 may include seam 104 and/or stitches 106. By way of explanation, each stitch line 102 is considered to include a plurality of individual stitches 106.

Skin 100 may be made of thermoplastic olefin (TPO), polyurethane (PUR) skin, thermoplastic polyurethane elastomer (TPU), and/or polyvinyl chloride (PVC). In alternative embodiments, skin 100 may be made of natural animal hide, or any combination of one or more of the foregoing materials. Moreover, the material used for skin 100 is not limited to the above-listed materials. The stitching material for stitch lines 102 may be made of any material conventionally used for stitching upholstery materials together.

Seal 200 may be made of open cell foam, closed cell foam (such as, but not limited to "type 8 foam"), a barrier film, a hot melt, or a combination of any one or more of the foregoing. However, the material used for seal 200 is not limited to the above-listed materials, as any suitable material may be employed. A barrier film may be made of polyurethane, polyethylene, PVC, and/or rubber. Hotmelt material may be PUR based.

Backing layer 300 may be made of polyurethane (PUR) open cell foam. In other embodiments, backing layer 300 may be made of closed cell foam. However, the material used for backing layer 300 is not limited to the above-listed materials. Other foam and/or non-foam materials may be used. For instance, backing layer 300 may include olefin based foam.

Substrate 400 is preferably made of an engineered polymer, such as polycarbonate acrylonitrile butadiene styrene (PCABS). Substrate 400 may include other materials including, but not limited to PP, ABS, glass-filled PP (GFPP), and/or Nylon. Moreover, substrate 400 may be made of any material with suitable rigidity that is chemically compatible with backing layer 300. ABS, PCABS, and Nylon are preferably fully compatible with backing layer 300 without material treatment. GFPP and PP are generally treated prior to foaming, where such treatment may include one or more of flame treatment, corona, and plasma.

In accordance with the objectives discussed above, the embodiment of FIG. 2 provides the aesthetically pleasing impression arising from molded groove 104 and from authentic stitch lines 102 while also providing a desirable tactile feel arising from the characteristics of a high-quality foam, such as polyurethane open cell foam (or other suitable foam materials), without incurring foam leakage through skin 100. Moreover, the trim portions 10, using TPO, PUR, TPU, or PVC as the material for skin 100, in accordance with one or more embodiments of the present invention, can preferably be produced at lower cost than those employing real leather.

In the embodiment of FIG. 2, seal 200 preferably operates to prevent the precursor foaming material of backing layer 300 from leaking through the holes of stitch lines 102 during the foaming process. Thereafter, seal 200 preferably remains permanently embedded within backing layer 300 and adjacent to skin 100. Once the assembly of trim section 10 is complete, the material properties of backing layer 300 preferably provide a cushion for skin 100 with a desirable feel and firmness level. The process for manufacturing trim portion 10 is discussed in greater detail later in this document.

Figure 3:
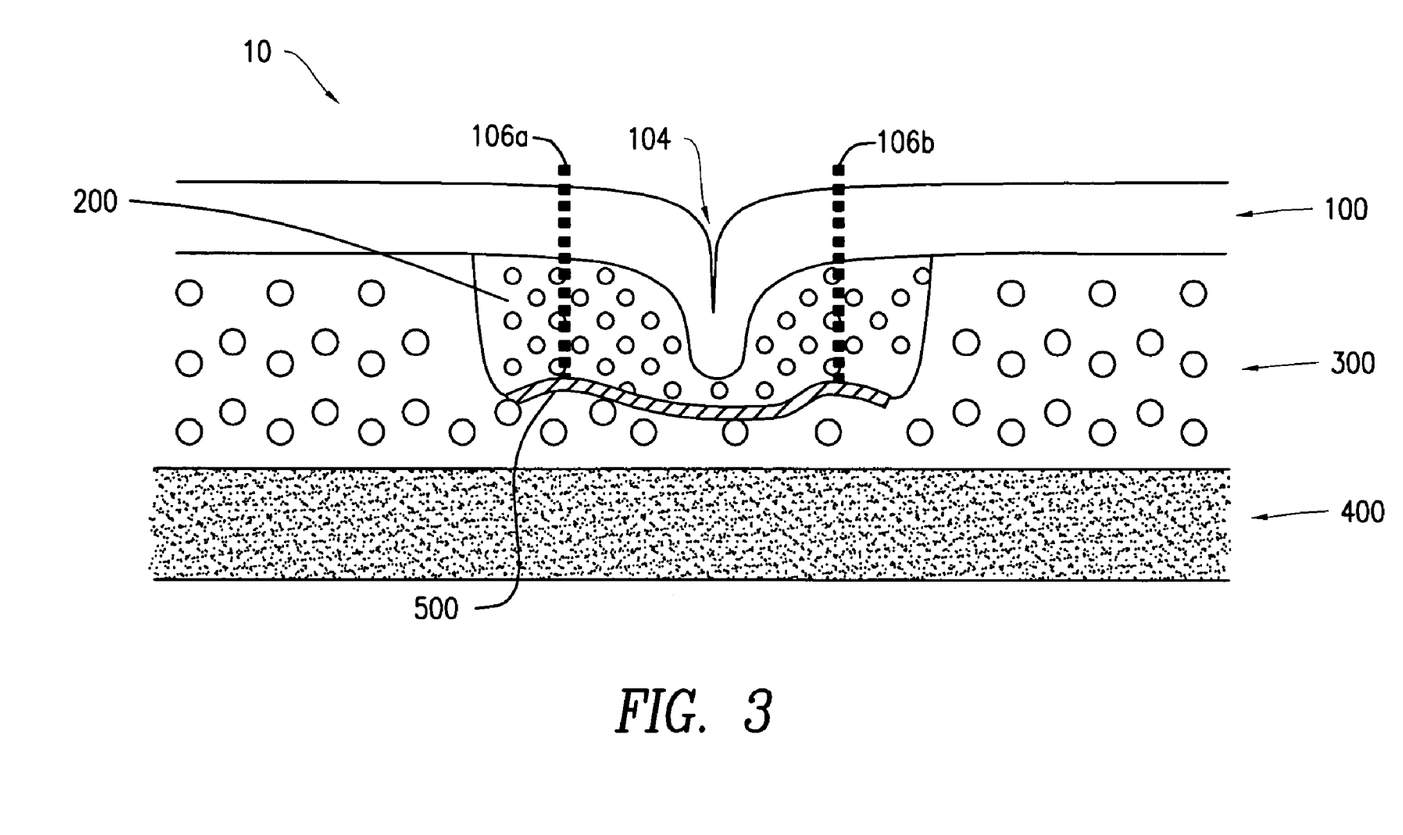
FIG. 3 is a sectional view of a portion of the interior trim of a vehicle having a thermoplastic film, in accordance with an embodiment of the present invention.

The embodiment of FIG. 3 is largely similar to that of FIG. 2. In the embodiment of FIG. 3, film 500, which may be made of a thermoplastic material, may be adhered to the bottom surface of seal 200. In this manner, film 500 may supplement the protection, against leakage of foam precursor material through the stitching holes, provided by seal 200. Any suitable thermoplastic material may be used for film 500. Moreover, other materials may be included in film 500 in place of, or in addition to, thermoplastic materials. Preferred thermoplastic materials useable for film 500 may include Polyurethane and/or Polyester (PE). Crape paper can also be used, along with adhesive on the attachment surface thereof. Herein, the term "insulation layer" may refer to any layer of material operable to inhibit leakage of foaming material through skin 100. Thus, herein, both film 500 and seal 200 are insulation layers.

Figure 4:
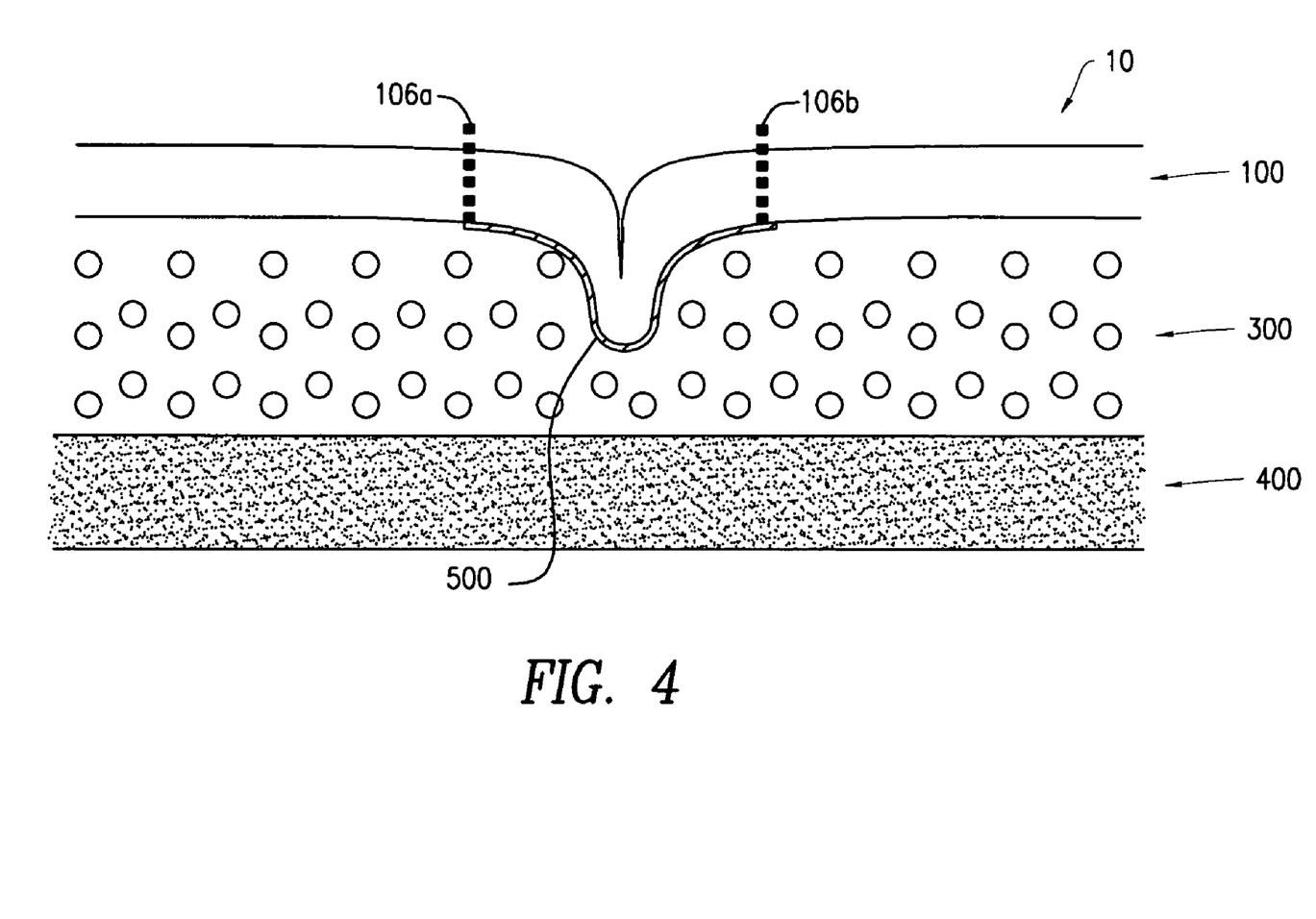
FIG. 4 is a sectional view of a portion of the interior trim of a vehicle having a thermoplastic film in accordance with an alternative embodiment of the invention.

FIG. 4 is a sectional view of a portion of the interior trim 10 of a vehicle having a thermoplastic film 500 in accordance with an alternative embodiment of the invention. In this embodiment, film 500 is preferably coupled directly to skin 100, without the presence of seal 200.

Figure 5:
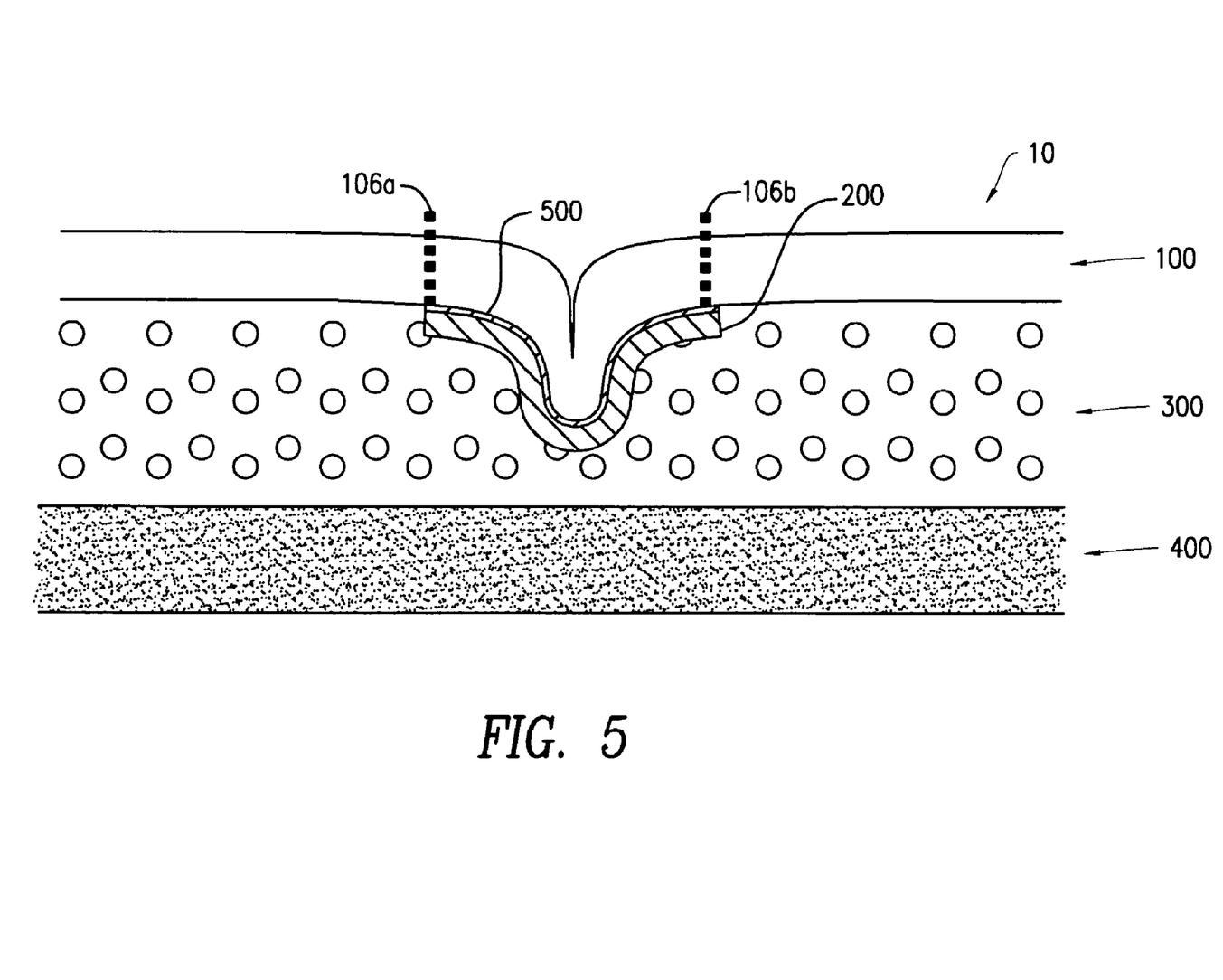
FIG. 5 is a sectional view of a portion of the interior trim of a vehicle having a thermoplastic film in accordance with another alternative embodiment of the invention.

FIG. 5 is a sectional view of a portion of the interior trim 10 of a vehicle having a thermoplastic film 500 in accordance with an alternative embodiment of the invention. In the embodiment of FIG. 5, film 500 is preferably coupled directly to skin 100. Seal 200 is preferably disposed along the bottom surface of film 500. Seal 200 may be adhered to the bottom surface of film 500. Alternatively, seal 200 may be placed along the bottom surface of film 500, and the skin 100, film 500, and seal 200 may be secured together using stitch lines 102.

Figure 6:
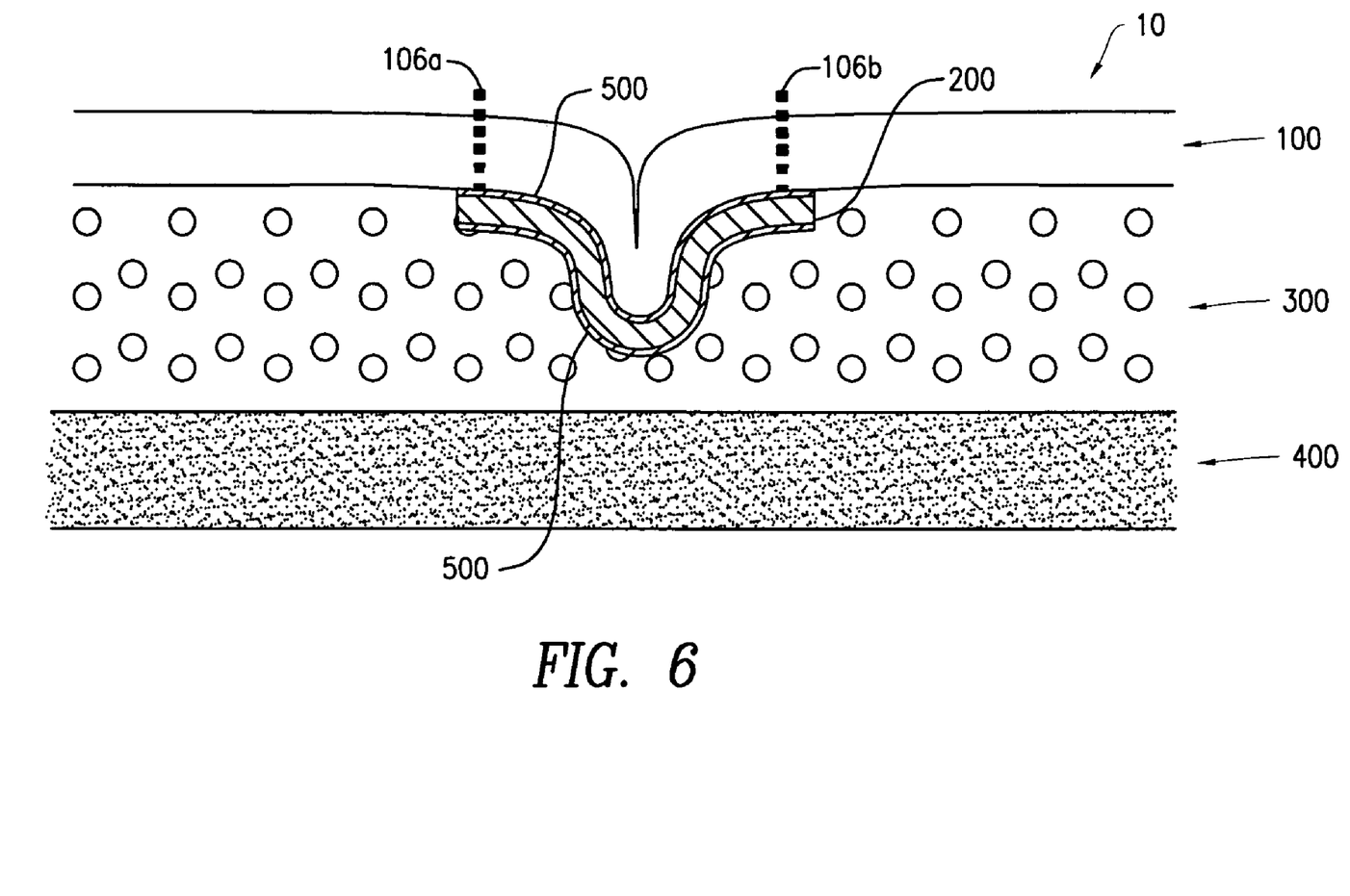
FIG. 6 is a sectional view of a portion of the interior trim of a vehicle having one thermoplastic film on each side of a seal in accordance with an alternative embodiment of the invention.

FIG. 6 is a sectional view of a portion of the interior trim 10 of a vehicle having one thermoplastic film 500 on each side of a seal 200 in accordance with an alternative embodiment of the invention. In the embodiment of FIG. 6, the succession of parts from top to bottom in the region proximate to stitches 106 is skin 100, a first film 500, seal 200, second film 500, backing layer 300, and substrate 400. The deployment of films 500 on either side of seal 200 is preferably operable to supplement the protection against foaming precursor material leakage through the holes for stitch lines 102 provided by seal 200.

In the following, preferred dimensions for the parts in the embodiments shown in FIGS. 2-6 are listed. However, it will be understood that the invention is not limited to the specific dimensions listed below. More specifically, dimensions for parts useable in various embodiments herein may be smaller or larger than the dimensions listed. The below-listed dimensions may apply to the embodiments of FIGS. 2-6, except that the data for film 500 is not applicable to the embodiment of FIG. 2.

Skin 100 may have a thickness (the top-to-bottom dimension as shown in FIG. 3) of about 1 millimeter (mm). Molded groove 104 may have a depth of about 0.75 mm as measured from the uppermost point of the top surface of skin 100 to the lowest point of the upper surface of groove 104.

Seal 200 may have a thickness of about 5 mm, as measured from the upper surface of seal 200 contacting skin 100 to the lowermost (in the view of FIG. 3) point of the lower surface of seal 200 contacting backing layer 300. Seal 200 may be about 14 mm wide, as measured from the left to the right edges of the surface contact between seal 200 and skin 100. Film 500 may have a thickness of about 0.08 to 0.10 mm. Film 500 is preferably highly malleable and preferably readily conforms to any shape it is applied to upon being exposed to moderate levels of heat and pressure.

The separation between stitch lines 102-*a* and 102-*b* may be about 8 mm. Thus, seal 200 (having a preferred width of about 14 mm) is preferably about 6 mm wider than the distance between stitch lines 102. When substantially centered with respect to stitch lines 102, seal 200 preferably extends about 3 mm beyond stitch 106-*a* on the left and about 3 mm beyond 106-*b* on the right, thereby operating to prevent exposure of backing layer 300 to stitches 106.

Backing layer 300 may be about 8 mm thick in regions to the left of and to the right of the left and right edges of seal 200, respectively. Thus, this distance corresponds to the distance between the lower (in the view of FIGS. 2 and 3) surface of skin 100 and upper surface of substrate 400. The thickness of backing layer 300 may be about 3 mm over a region within which seal 200 or the combination of seal 200 and film 500 are located above backing layer 300.

Substrate 400 may be about 3 mm thick. As stated earlier herein, the dimensions recited herein are merely preferred dimensions of the respective parts in one or more preferred embodiments of the present invention. However, the present invention is not limited to employing the dimensions recited herein.

FIGS. 7A, 7B, 7C, and 7D show a sequence of stages of manufacture of the trim section 10 of FIG. 3, in accordance with an embodiment of the present invention.

Figure 7A:
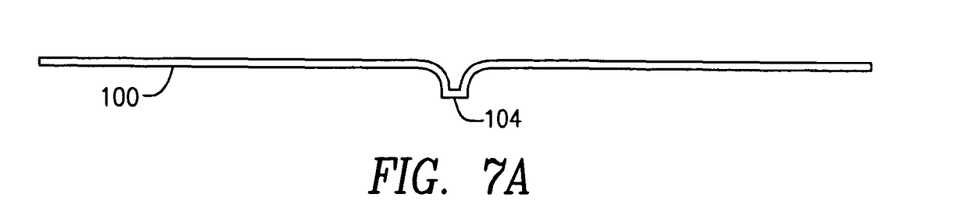
FIGS. 7A, 7B, 7C, and 7D show a sequence of stages of manufacture of the interior trim section of FIG. 3, in accordance with an embodiment of the present invention.

Skin 100 may be subjected to in-mold graining (IMG) to generate a desired shape for skin 100 as a whole, provide graining on the surface of skin 100, and/or mold a groove 104 along skin 100. A suitable tool may be employed to create an impression within groove 104 to provide faux stitches (fake stitches) within groove 104. In an alternative embodiment, real stitching could be provided within groove 104. FIG. 7A shows skin 100 after the IMG process.

Figure 7B:
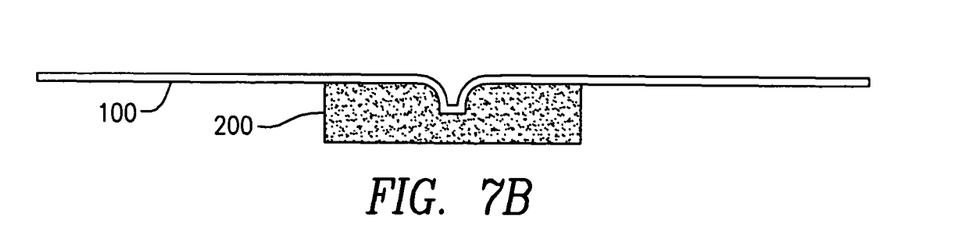
Figure 7C:
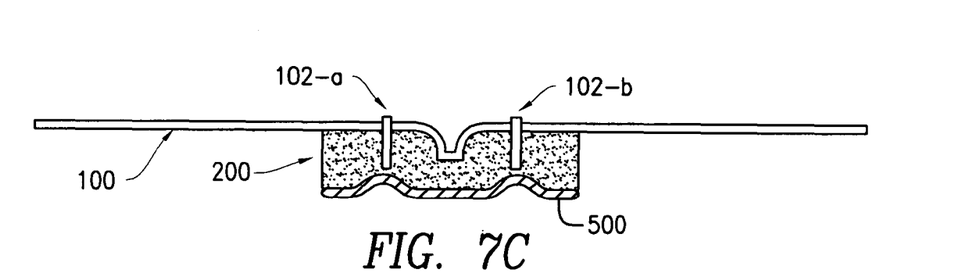

FIG. 7B shows skin 100 after the placement of seal 200 adjacent thereto; and FIG. 7C shows the stitch lines 102 threaded through both skin 100 and seal 200. In one embodiment, seal 200 may first be affixed to the bottom (unexposed) surface of skin 100 using a suitable adhesive. Adhesive may be used or omitted when joining seal 200 and skin 100, depending upon the characteristics of backing layer 300. Specifically, when open pour foam is used for backing layer 300, adhesive is generally not needed in between seal 200 and skin 100. In this case, stitch lines 102 alone are preferably sufficient to secure seal 200 to skin 100. When closed pour foam is used for backing layer 300, adhesive is preferably used to secure seal 200 to skin 100, in addition to stitch lines 102.

In the embodiments of FIG. 5 and FIG. 6, the upper surface of seal 200 is placed adjacent to the bottom surface of a film 500 in the process of forming trim 10. The above discussion of the attachment of seal 200 to skin 100 applies to the embodiments of FIGS. 5 and 6 as well. Specifically, adhesive may, but need not, be used to affix seal 200 to film 500. In some cases, the decision whether or not to employ adhesive may depend on the characteristics of backing layer 300. Specifically, when open pour foam is used for backing layer 300, adhesive is generally not needed in between seal 200 and film 500. In this case, stitch lines 102 alone are sufficient to secure seal 200 to skin 100 and film 500. When closed pour foam is used for backing layer 300, adhesive is preferably used to secure seal 200 to film 500, in addition to using stitch lines 102 to bind together skin 100, film 500, and seal 200. In the embodiment of FIG. 6, stitch lines may bind skin 100, first film 500, seal 200, and second film 500. Alternatively, in the embodiment of FIG. 6, stitch lines 102 may extend only through skin 100, first film 500, and seal 200, and not through the second (lower in the view of FIG. 6) film 500.

After locating seal 200 adjacent to skin 100 and/or adhering seal 200 and skin 100 together, stitch lines 102 may be sewn through the assembly of skin 100 and seal 200. In another embodiment, a sew guide or other suitable fixturing device may operate to remove a backing material (which may be made of paper) from seal 200, thereby exposing an adhesive material on the surface of seal 200 facing skin 100, while skin 100 and seal 200 are stitched together.

In yet another embodiment, stitch lines 102 may be threaded into skin 100 alone, and seal 200 may be then be affixed to skin 100. A suitably configured sewing machine may be used to sew skin 100 alone, skin 100 and seal 200 together, or any other desired combination of parts.

Referring to the embodiment of FIG. 3, once seal 200 is attached to skin 100 and stitch lines 102 have been sewn, film 500 may be affixed to the bottom surface of seal 200 using a suitable adhesive. Once film 500 has been attached to seal 200, trim portion 10 appears as shown in FIG. 7C. As discussed in connection with FIG. 3, film 500 may be made of a thermoplastic material. Film 500 may be applied to seal 200 using suitable machinery, discussed below.

Referring to the embodiment of FIG. 3, once seal 200 is attached to skin 100 and stitch lines 102 have been sewn, film 500 may be affixed to the bottom surface of seal 200 using a suitable adhesive. Once film 500 has been attached to seal 200, trim portion 10 appears as shown in FIG. 7C. As discussed in connection with FIG. 3, film 500 may be made of a thermoplastic material. Film 500 may be applied to seal 200 using suitable machinery, discussed below.

Attention is now directed to the method for affixing film 500 to either skin 100 or seal 200, depending on the embodiment. The process described below may be used to affix film 500 either to skin 100 or to seal 200. A hot air welding machine may be used to affix film 500 to skin 100 or seal 200.

The machine may employ a flow of hot air to heat film 500 as film 500 is fed over the seal 200 or skin 100. The welding machine may include a film feeding mechanism to feed, or direct, film 500 over seal 200 or skin 100. The feeding mechanism may include an upper wheel and a lower wheel that together operate to press the film and other part (such as skin 100 or seal 200) together as the film 500 is applied to the other part (such as skin 100 or seal 200). The combination of heat and pressure is preferably operable to heat bond the film 500 to either the seal 200 or to the skin 100. One such hot air welding machine is available from Millerweldmaster of Ohio. However, the present invention is not limited to the use of any particular welding machine or to any one process for affixing film 500 to seal 200 or skin 100.

In an embodiment, the skin-seal assembly shown in FIG. 7C and substrate 400 are preferably securely positioned with respect to one another. Thereafter, a foam-in-place operation is preferably conducted to create backing layer 300. More specifically, a foam precursor material is preferably poured or injected into the space between the assembly shown in FIG. 7C and substrate 400, using an appropriate housing to contain the precursor fluid. The foam then preferably cures over a suitable period. Polyurethane foam may be employed. However, the present invention is not limited to the use of polyurethane.

Preferably, control over parameters of the foam-in-place process may enable control over the resulting properties of backing layer 300. For example, process variables such as foam thickness, cure time, and/or cure temperature may be controlled so as to provide desired values of hardness, durometer, and/or a desired tactile feel for trim portion 10.

Figure 7D:
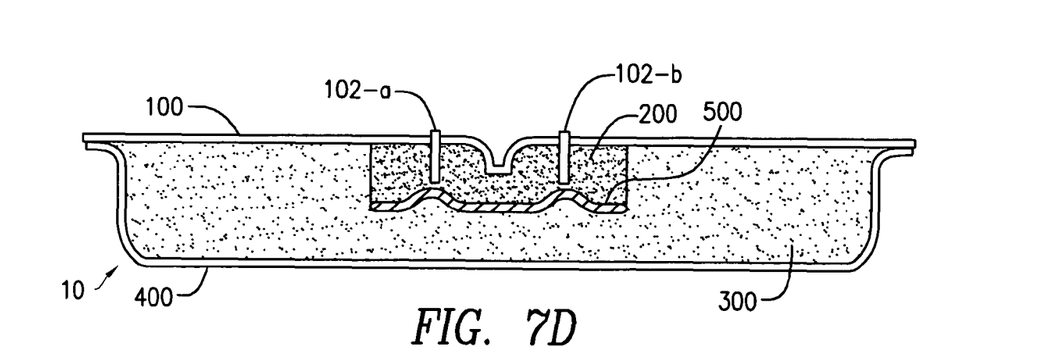

Upon completion of the foam-in-place process, trim portion 10 preferably appears as shown in FIG. 7D. During the foam-in-place process, seal 200, and the one or more films 500 are preferably operable to prevent the highly liquid (i.e. non-viscous) foaming material from leaking the holes of stitch lines 102.

Figure 8:
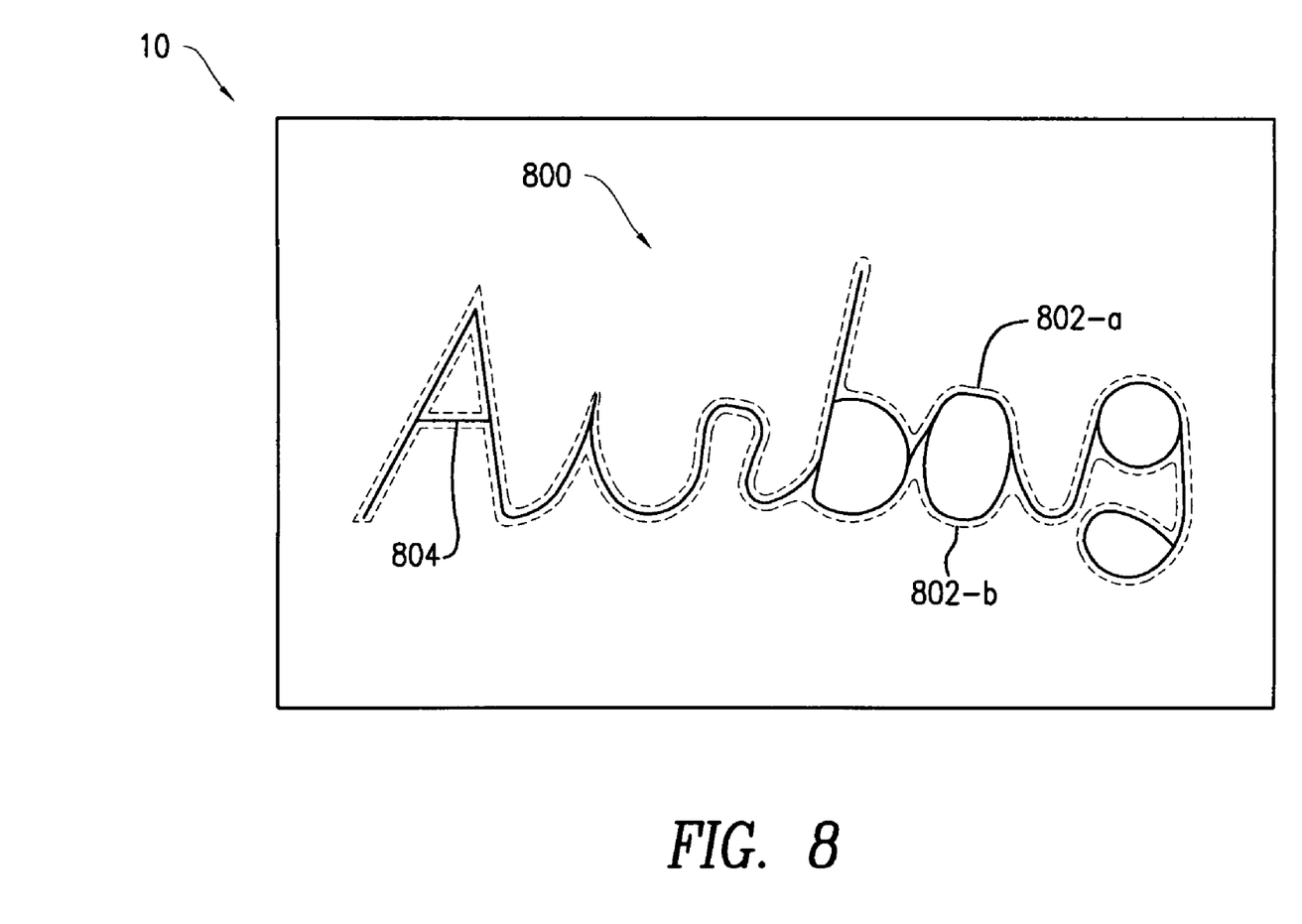
FIG. 8 is a plan view of a portion of the interior trim of a vehicle showing lettering embroidered into the trim which may include, but is not limited to logos, in accordance with an embodiment of the present invention.

FIG. 8 is a plan view of a portion of the interior trim 10 of a vehicle showing lettering 800 embroidered into the trim 10 in accordance with an embodiment of the present invention. In this embodiment, the embroidery path may include logos and/or a molded groove 804 at the center and stitch lines 802-a and 802-b (similar to stitch lines 102-a and 102-b discussed earlier herein) on respective sides of the molded groove 804. Embroidered lettering 800 may be employed to provide descriptive information, such as the term "Airbag" shown in FIG. 8. However, logos, and other decorative shapes may be provided in place of, or in addition to, such descriptive information. Although embroidered lettering 800 has been added to trim portion 10, the sealing of trim portion 10 against foam leakage is preferably implemented in the same manner as described in connection with the embodiments of FIGS. 1-7 herein.

Figure 9:
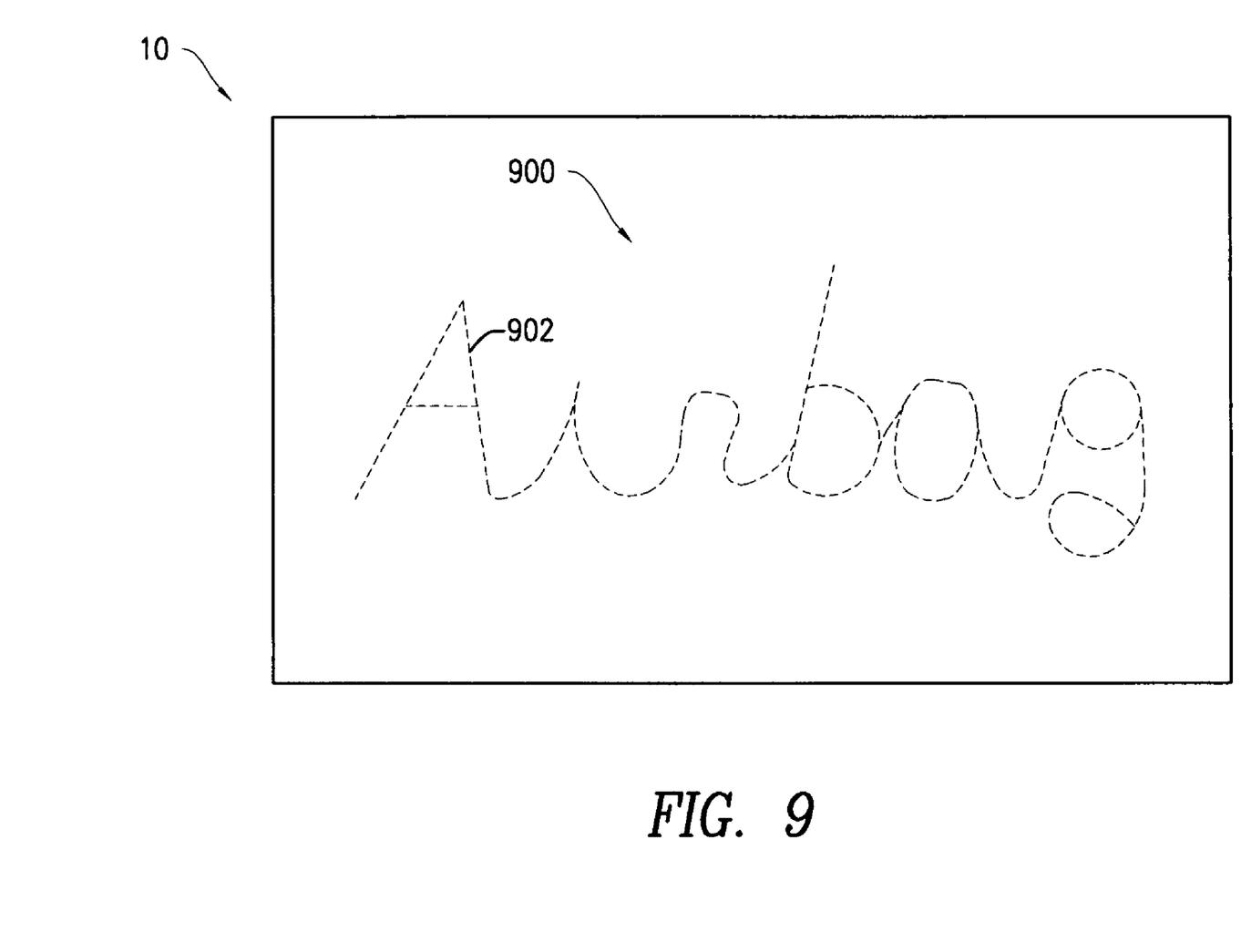
FIG. 9 is a plan view of a portion of the interior trim of a vehicle showing lettering embroidered into the trim in accordance with another embodiment of the present invention.

FIG. 9 is a plan view of a portion of the interior trim 10 of a vehicle showing lettering 900 embroidered into the trim in accordance with another embodiment of the present invention. In this embodiment, embroidered lettering 900 includes a single stitch line 902 in place of the combination of a molded groove 804 and dual stitch lines 802-a, 802-b shown in FIG. 8. As with the embodiment of FIG. 8, the embroidered lettering of the type shown in FIG. 9 may be employed to provide descriptive information such as the word "Airbag" and/or decorative information such as logos or other images. As with the embodiment of FIG. 8, the sealing of trim portion 10 of FIG. 9 against foam leakage is preferably implemented in the same manner described in connection with the embodiments of FIGS. 1-7 herein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An article of manufacture, comprising:
   a skin including a molded groove, the skin having an exposed surface and a lower surface, the skin forming a sheet of material;
   a seal having an upper surface disposed adjacent to the lower surface of the skin and covering a region of the lower surface of the skin including the molded groove wherein the seal has at least two layers such that the first layer is a thermoplastic film affixed to the lower surface of the skin, and the second layer is made of closed cell foam coupled to the first layer;
   at least one strand of stitching material threading the skin and the seal together; and
   a backing layer forming a backing for the skin and the seal, the backing layer having an upper surface secured to the skin and the seal, and a lower surface.

2. The article of manufacture of claim 1 wherein the skin includes at least one material selected from the group consisting of:
   thermoplastic olefin (TPO); polyurethane (PUR); thermoplastic polyurethane elastomer (TPU); and polyvinyl chloride (PVC).

3. The article of manufacture of claim 1 wherein the groove includes faux stitching molded therein.

4. The article of manufacture of claim 1 wherein the backing layer includes material selected from the group consisting of: a) open cell polyurethane and b) closed cell polyurethane.

5. The article of manufacture of claim 1 further comprising:
   a substrate adhered to the lower surface of the backing layer.

6. An article of manufacture, comprising:
   a skin including a molded groove, the skin having an exposed surface and a lower surface, the skin forming a sheet of material;
   at least one insulation layer having an upper surface located adjacent to the lower surface of the skin and covering a region of the lower surface of the skin including the molded groove, the at least one insulation layer includes at least a first layer and a second layer, wherein the first layer is a thermoplastic film affixed to the skin, and the second layer is a seal made of closed cell foam coupled to the first layer;
   at least one strand of stitching material threaded between the exposed surface of the skin and the at least one insulation layer; and
   a backing layer forming a backing for the skin and the at least one insulation layer, the backing layer having an upper surface secured to the skin and the insulation layer, and a lower surface.

7. An article of manufacture comprising:
   a skin including a molded groove, the skin having an exposed surface and a lower surface, the skin forming a sheet of material;

at least one insulation layer having an upper surface located adjacent to the lower surface of the skin and covering a region of the lower surface of the skin including the molded groove wherein the at least one insulation layer includes first, second, and third layers, wherein the first layer is a first thermoplastic film affixed to the skin, wherein the second layer is a foam seal coupled to the first layer, and wherein the third layer is a second thermoplastic film coupled to the foam seal, at least one strand of stitching material threaded between the exposed surface of the skin and the at least one insulation layer; and a backing layer forming a backing for the skin and the at least one insulation layer, the backing layer having an upper surface secured to the skin and the insulation layer, and a lower surface.

8. An article of manufacture, comprising:

a skin including a molded groove, the skin having an exposed surface and a lower surface, the skin forming a sheet of material;

a seal having an upper surface disposed adjacent to the lower surface of the skin and covering a region of the lower surface of the skin including the molded groove wherein the seal has at least two layers such that a first layer is made of foam and affixed to the lower surface of the skin, a second layer is a thermoplastic film coupled to the first layer;

at least one strand of stitching material threading the skin and the first layer together; and a backing layer forming a backing for the skin and the seal, the backing layer having an upper surface secured to the skin and the seal, and a lower surface.

* * * * *